(12) United States Patent
Nätti et al.

(10) Patent No.: US 9,067,290 B2
(45) Date of Patent: Jun. 30, 2015

(54) ATTACHING DEVICE, ATTACHING ARRANGEMENT AND METHOD FOR ATTACHING AN OBJECT TO BE WORKED TO A WORKING BASE

(75) Inventors: Reijo Nätti, Littoinen (FI); Janne Pulkkinen, Raisio (FI)

(73) Assignee: IXTUR OY, Piikkio (FI)

( * ) Notice: Subject to any disclaimer, the term of this patent is extended or adjusted under 35 U.S.C. 154(b) by 214 days.

(21) Appl. No.: 13/698,557

(22) PCT Filed: May 25, 2011

(86) PCT No.: PCT/FI2011/050476
§ 371 (c)(1),
(2), (4) Date: Nov. 16, 2012

(87) PCT Pub. No.: WO2011/148057
PCT Pub. Date: Dec. 1, 2011

(65) Prior Publication Data
US 2013/0055551 A1  Mar. 7, 2013

(30) Foreign Application Priority Data
May 25, 2010 (FI) ..................................... 20105582

(51) Int. Cl.
*B23Q 3/15* (2006.01)
*B23Q 3/154* (2006.01)
(Continued)

(52) U.S. Cl.
CPC ......... *B23Q 3/1546* (2013.01); *Y10T 29/49998* (2015.01); *B23Q 3/154* (2013.01); *H01F 7/206* (2013.01); *B23Q 3/1543* (2013.01); *H01F 7/0226* (2013.01); *H01F 2007/208* (2013.01)

(58) Field of Classification Search
CPC ... H01F 7/206; H01F 2007/208; B23Q 3/154; B23Q 3/1543
USPC ............... 335/285, 289–295; 269/8; 294/65.5
See application file for complete search history.

(56) References Cited

U.S. PATENT DOCUMENTS 3,105,330 A  10/1963 Grage
3,774,133 A  11/1973 Voges
(Continued)

FOREIGN PATENT DOCUMENTS

CH          661 235 A5    7/1987
DE          25 43 709 A1  4/1976
(Continued)

OTHER PUBLICATIONS

International Search Report (PCT/ISA/210) issued on Sep. 1, 2011, by the Finnish Patent Office as the International Searching Authority for International Application No. PCT/FI2011/050476.
(Continued)

*Primary Examiner* — Ramon Barrera
(74) *Attorney, Agent, or Firm* — Buchanan Ingersoll & Rooney PC (57) ABSTRACT

The invention relates to an attaching device, an arrangement and a method for attaching an object to be worked to a working base. The attaching device comprises: a first holder in the first end of the attaching device for attaching the attaching device to the working base or to another attaching device or to the object to be worked; a second holder in the second end of the attaching device for attaching the attaching device to the working base or to another attaching device or to the object to be worked; and a controller for controlling the holding forces produced by the first and second holders.

17 Claims, 10 Drawing Sheets

(51) Int. Cl.
*H01F 7/20* (2006.01)
*H01F 7/02* (2006.01)

(56) References Cited

U.S. PATENT DOCUMENTS

| | | | |
|---|---|---|---|
| 3,798,581 A | 3/1974 | Anderson et al. |
| 3,978,441 A | 8/1976 | Sobottka et al. |
| 4,015,174 A | 3/1977 | Cotton de Bennetot |
| 4,075,589 A | 2/1978 | Braillon |
| 4,122,423 A | 10/1978 | de Bennetot |
| 4,356,467 A | 10/1982 | Cardone et al. |
| 4,399,482 A | 8/1983 | Inoue |
| 4,461,463 A | 7/1984 | Okubo |
| 4,554,610 A | 11/1985 | Metz et al. |
| 4,594,568 A | 6/1986 | Hübner et al. |
| 4,782,315 A | 11/1988 | Bataille et al. |
| 4,847,582 A | 7/1989 | Cardone et al. |
| 4,965,695 A | 10/1990 | Baumann |
| 5,372,357 A | 12/1994 | Blaimschein |
| 5,677,821 A | 10/1997 | Myr |
| 5,741,111 A | 4/1998 | Goostrey |
| 5,864,274 A | 1/1999 | Steingroever et al. |
| 6,489,871 B1 | 12/2002 | Barton |
| 6,639,496 B1 | 10/2003 | van Namen |
| 2007/0171016 A1 | 7/2007 | Bonjean et al. |
| 2009/0184789 A1 | 7/2009 | Lee |
| 2009/0251252 A1 | 10/2009 | Wang et al. |
| 2010/0301839 A1 | 12/2010 | Cardone et al. |
| 2011/0073118 A1 | 3/2011 | Ponsort et al. |
| 2011/0248435 A1 | 10/2011 | Cosmai et al. |

FOREIGN PATENT DOCUMENTS

| | | |
|---|---|---|
| DE | 197 06 659 A1 | 11/1997 |
| EP | 0 794 540 A1 | 9/1997 |
| EP | 1 811 536 A1 | 7/2007 |
| FR | 2 564 768 A1 | 11/1985 |
| GB | 444786 A | 3/1936 |
| GB | 1 112 297 A | 5/1968 |
| GB | 1 270 176 A | 4/1972 |
| GB | 2 008 853 A | 6/1979 |
| GB | 2 041 799 A | 9/1980 |
| JP | 59-182039 A | 10/1984 |
| JP | 63-260738 A | 10/1988 |
| JP | 02-051045 U | 4/1990 |
| JP | 6-304788 A | 11/1994 |
| JP | 9-174473 A | 7/1997 |
| JP | 11-104930 A | 4/1999 |
| JP | 2000-058318 A | 2/2000 |
| KR | 10-0833102 B1 | 5/2008 |
| KR | 2008-0043135 A | 5/2008 |
| WO | WO 2007/123358 A1 | 11/2007 |
| WO | 2008/032333 A1 | 3/2008 |
| WO | WO 2008/142716 A2 | 11/2008 |
| WO | WO 2009/144189 A1 | 12/2009 |

OTHER PUBLICATIONS

Written Opinion (PCT/ISA/237) issued on Sep. 1, 2011, by the Finnish Patent Office as the International Searching Authority for International Application No. PCT/FI2011/050476.

Search Report issued on Dec. 1, 2010, by the Finnish Patent Office for Application No. 20105582.

ATTACHING DEVICE, ATTACHING ARRANGEMENT AND METHOD FOR ATTACHING AN OBJECT TO BE WORKED TO A WORKING BASE

TECHNICAL FIELD OF THE INVENTION

An object of the invention is an attaching device, an arrangement and a method for attaching an object to be worked to a working base according to the preambles of the independent claims presented further below. The invention especially relates to a new way for supporting a piece to be for example welded, milled, cut, painted or sandblasted to its base during working.

PRIOR ART

The pieces to be worked must generally in some way be attached in their place for the duration of for example the milling, welding, drilling or bevelling. In order to achieve a precise result, the attaching must usually also be made in a precise manner. Known methods are slow and laborious and do not make possible automatic attaching like the arrangement presented in the invention.

OBJECT AND BRIEF DESCRIPTION OF THE INVENTION

It is an object of the present invention, among other things, to reduce or even eliminate above-mentioned problems of the prior art.

It is especially an object of the present invention to provide a solution, which provides a quick, precise and easy manner of attaching differently-shaped pieces to be worked to their working base.

In order to achieve among others the objects mentioned above, the attaching device, arrangement and method and other objects of the invention are characterised by what is presented in the characterising parts of the enclosed independent claims.

The embodiments and advantages mentioned in this text apply, when applicable, both to the attaching device, arrangement, method and other objects according to the invention, even though it is not always specifically mentioned.

A typical attaching device according to the invention for attaching an object to be worked to a working base comprises a first holding means, i.e. a first magnet, in the first end of the attaching device, which first magnet is arranged to produce a first holding force for attaching the attaching device to the working base, such as to a table, or to another attaching device or to the object to be worked;

a second holding means, such as a second magnet, in the second end of the attaching device, which second holding means, such as the magnet is arranged to produce a second holding force for attaching the attaching device to the working base, such as to a table, or to another attaching device or to the object to be worked;

control means for controlling the holding forces produced by the first and second holding means, such as the magnets.

There may be more than two controllable holding means, such as magnets, in one attaching device.

The attaching device may thus have two or more controllable magnets. But the attaching device may have only one controllable magnet and one or more other holding means. The other holding means may for example be some mechanical holding means, such as a clamp, a suction cup or tongs.

Typically the attaching device has at least two such holding means, the holding force of which can be controlled. The other holding means are known as such, so their operation is not described further in this text.

A typical arrangement according to the invention for attaching an object to be worked to a working base utilizes one or more attaching devices according to the invention. The arrangement comprises a control unit, such as a programmable computer and its user interface for producing control signals to the first and second holding means, such as the magnets, of the attaching devices. The control unit may be separate from the attaching devices. The arrangement also comprises data transfer devices for transmitting the control signals to the control means of the attaching devices. The data transfer devices may be wireless and they may use some known data transfer method, such as radio, light, sound or the like.

Some embodiments of the arrangement comprise a robot or a corresponding NC-programmable device, which comprises means for placing the attaching devices in desired places for example on the working base or attached to other attaching devices.

A machined metal plate or other magnetic substance may for example function as the working base. The system may also itself function as its own working base, i.e. the system may assemble a working base from itself. The jig may also be assembled completely without a particular working base.

One method according to the invention for attaching an object to be worked to a working base by means of an attaching device comprises:

attaching an attaching device by its first end to the working base, such as a table, or to another attaching device or to the object to be worked, with the aid of a first holding force produced by the first holding means, i.e. the first magnet;

attaching the attaching device by its second end to the working base, such as the table, or to another attaching device or to the object to be worked, with the aid of a second holding force produced by the second holding means, such as the second magnet or other holding means.

The method may utilize one or more attaching devices according to the invention and/or arrangements according to the invention.

The different embodiments of the invention are suitable for use in connection with various kinds of substances and working methods. The invention may be used for example for bevelling, flame cutting, laser cutting, water cutting, plasma cutting, pipe cutting, welding, milling, machining, pressing, painting, sandblasting, burring, drilling and for temporarily attaching parts to each other.

The attaching device must when desired be able to firmly grab onto another attaching device, an object to be worked and the working base. On the other hand, when desired, the attaching device must be possible to detach from the other attaching device, the object to be worked and the working base. In the attaching device according to the invention the grabbing onto another attaching device, an object to be worked and the working base is done by means of the magnetic field produced with magnets, negative pressure or the like. The attaching device has control means, by means of which the holding forces, i.e. the holding manner, such as the magnetic fields produced by the first and second holding means, such as the magnets, may be controlled to enable grabbing and detaching.

The magnetic field produced by the holding force may be provided with an electric magnet or a magnetic material or both. The magnet generates a magnetic field which produces a holding force, and when electric current is fed through the electric magnet coil, the holding force cancels out the magnetic flux produced by the magnetic material or strengthens it, depending on in which direction current is fed into the coil.

By controlling the amount of current, the holding force can be selected as desired. By turning off the current, the holding force does not cease, but the magnet remains holding. When using magnetic material, the weakening of the holding force of the magnetic fastener may be realized either mechanically by changing the magnetic circuit inside the attaching device or by weakening the field created by the magnetic material with the electric magnet close to the magnetic material.

In one embodiment of the invention the holding force is controllable, so that in connection with attaching the piece, the holding force of the magnet of the attaching device is increased in steps or degrees, so that the object to be attached would not slam against the attaching device. In one embodiment of the invention the holding force is controllable, so that in connection with detaching the piece, the holding force of the magnet of the attaching device is decreased in steps or degrees. In one embodiment of the invention the holding force may be increased if it is detected that the magnet is detaching.

The controlling of the holding force of the magnets may be performed manually, for example by a switch or a lever in the attaching device. The connecting of electric current to the magnets may also be arranged to occur automatically, for example controlled by a computer program. It is possible to arrange one or more magnets to be used remotely. The remote drive may be wireless. In one embodiment the remote drive may be wired.

It has thus now been noted that the piece to be worked may simply and quickly be attached to its working base by means of magnets, the holding force of which may be controlled, or with another corresponding method. Magnets are reliable and simple devices.

By means of the invention, the attaching of the piece to be worked to its base can simply be automated. It is possible to program a robot to place the attaching devices in desired places on the working base. The programming and designing of the robots and automatism is not especially an object of this application, so it is not discussed further in this context.

In one embodiment of the invention the control means are arranged so that the first and second holding means, such as magnet, are separately controllable. In one embodiment of the invention the second holding means, such as the magnet, is controlled manually from a lever or switch in the attaching device or remotely. In one embodiment of the invention one of the holding means, such as the magnet, is controlled manually and one automatically. Thus the same attaching device is suitable for different use purposes and situations.

In one embodiment of the invention an insulation insulating from the magnetic flux is arranged between the first and the second magnet, such as a plate manufactured from fibreglass or another material insulating the magnetic flux. Other suitable materials may for example be aluminium, plastic, acid resistant steel, glass. Thus the operation of one magnet does not disturb the operation of the other magnet.

In one embodiment of the invention the magnets are insulated to be waterproof. In one embodiment the magnets are cast into a suitable hardening material, for example polyester resin. Waterproofness is sometimes important, because workings often use liquids, which may otherwise cause a short circuit in the electric devices.

In one embodiment of the invention, the attaching devices according to the invention are used under water. In one embodiment of the invention the entire attaching device is insulated to be waterproof. Attaching devices according to the invention, which are waterproof, especially those which are waterproof and can be used remotely, are especially well suited for working under water.

In one embodiment of the invention the control means in the attaching device comprise means for leading the electric current in a controlled manner from an electric power source to the first and/or second holding means, such as magnet, in order to control its function.

In one embodiment of the invention the control means comprise an electric power source, such as a battery, and means for steering the electric current from the power source to the first and/or second magnet. In other words the attaching device thus has its own electric power source, such as battery.

An arrangement according to the invention may have a charging device, whereto the attaching devices are connected when they are not doing attaching work. The attaching device thus has the necessary means, for example connectors and cables or means enabling wireless charging, by means of which the electric power source is connectable to the charging device and chargeable. When using wireless attaching devices, electric wires can be avoided.

The charging device according to the invention may also be arranged to function as a parking device for the attaching device.

In one embodiment of the invention the attaching device comprises a wireless receiver for receiving a control signal from the control means. The arrangement according to the invention thus comprises a wireless transmitter. When using wireless attaching devices, electric wires can be avoided. In one embodiment of the invention the attaching device comprises a wireless transmitter for transmitting information, such as operation data of the attaching device, temperature, detaching of the magnet etc. data from the attaching device for example to a control unit outside the attaching device.

In one embodiment of the invention the attaching device comprises at least in its one end a mechanical attaching means, such as a hook, spike, bolt or peg. The first or second magnet may thus be arranged to move said mechanical attaching means. The mechanical attaching means may also be moved by hand. Such an attaching device may be arranged to attach to a working base or object to be worked manufactured from any material, also a non-magnetic material.

The mechanical attaching means may also function as a movement limiter or a limit switch. The automatism controlling the arrangement may be arranged to place said limiters or limit switches precisely in the desired places of the piece to be worked. The mechanical limiters or limit switches may for example be placed in precise places on the edges of the piece to be worked. When such limiters or limit switches are in place, the piece to be worked is easy to place correctly according to them.

In one embodiment of the invention the attaching device comprises a frame, in the different ends of which the first and second holding means, such as the magnet, is attached. The frame may for example be tube-like or cubic.

In one embodiment of the invention the frame of the attaching device is manufactured from stainless steel and in another embodiment from fibreglass.

In one embodiment of the invention the frame of the attaching device comprises means for selecting its length as desired. The frame may for example be telescopic. The frame may have a locking device, such as a clamp, for locking the length of the attaching device as desired. The locking of the length may also be done with a permanent magnet. Thus the same attaching device is suitable for different use purposes and situations.

In one embodiment of the invention the frame of the attaching device comprises means for bending it into a desired position. The frame may for example consist of two parts, which are joined together with a hinge or joint, for example with a ball joint. The frame may have a locking device, such as a clamp, for locking the position as desired. The locking of the position may also be done with a permanent magnet. Thus the same attaching device is suitable for different use purposes and situations.

In one embodiment of the invention the frame of the attaching device comprises several hydraulic cylinders, for example one in each corner of the frame. A magnet valve or the like may be used to control the passage of hydraulic fluid into the cylinders. When the fluid can flow, the length of the hydraulic cylinders may be changed. If the length of all of the hydraulic cylinders is changed by the same amount, the length of the frame changes, but the ends of the attaching device, their holding devices, do not turn in relation to each other. If, on the other hand, the lengths of the hydraulic cylinders are changed differently, the attaching device bends. In other words, the ends of the attaching device, their holding means, turn in relation to each other. By closing the magnetic valve or corresponding, the valve can be locked into place.

In one embodiment of the invention the first and/or second magnet comprises a magnetic material part comprising magnetic material and an electric magnet part comprising an electric magnet, whereby the control means are arranged to control the magnetic field produced by the electric magnet. By controlling the strength of the magnetic field produced by the electric magnet the first and/or the second holding force may be controlled. Using magnetic material makes it possible that the attaching device does not during its normal operation continuously need an external power source as a source for the holding force. A relatively small power source, such as a battery, well suffices as the power source for an electric magnet functioning in a control purpose. It may be arranged as a fixed part of each separate attaching device. Such an attaching device may function completely wirelessly, and does thus not during normal operation need electric wires to its outside.

In one embodiment of the invention the magnetic material is permanent magnetic material. Thus the effect of the holding force produced by the magnetic material may, if necessary, be decreased or strengthened with the magnetic field of the electric magnet. The magnetic fields of the permanent magnet and the electric magnet may in a manner known as such be set to cancel out each other's effect or set to strengthen each other. In other words the magnetic field of the permanent magnetic material may be used to provide the holding force according to the invention, which, if necessary, is weakened or strengthened with the magnetic field of the electric magnet and/or mechanically. The detaching or attaching of the attaching device thus occurs by weakening or strengthening the magnetic flux created by the first or second permanent magnet with the aid of an electric magnet. Suitable dimensions of the magnets and required electric currents and materials may be selected separately for each situation. For example in some cases, one must be careful that the permanent magnet is not demagnetised, if this is not the purpose.

In one embodiment of the invention the magnetic material is a demagnetisable and re-magnetisable magnetic material, whereby the magnetic material may, when necessary, in a manner known as such be demagnetised and re-magnetised with the magnetic field of the electric magnet. In other words the holding force is provided by magnetising the magnetic material with the aid of the electric magnet. The holding force may be decreased or even removed by demagnetising the magnetic material with the aid of the electric magnet. Suitable dimensions of the magnets and required electric currents and materials may be selected separately for each situation.

In one embodiment of the invention the magnet is switched off and on partly mechanically by moving the parts of the magnet in relation to each other. The attaching device may for example have a centre comprising a permanent magnet part, which is arranged to be moveable in relation to the rest of the magnet. The centre remains attached to the other parts of the magnet with the aid of the power of the permanent magnet, maintaining the part of the closed circuit of the magnetic flux, which is inside the magnet. Typically the piece to be attached to the magnet, such as for example the object to be worked or the working base, forms the part of the closed circuit of the magnetic flux, which is outside the magnet. An electric magnet coil has typically been suitably arranged around the centre. When current is led to the coil in a certain direction, the magnetic field produced by the coil weakens the magnetic field of the permanent magnet. At a certain strength of the magnetic field the centre is detached from the other parts of the magnet, whereby the closed circuit of the magnetic flux is broken, the magnetic force weakens and the magnet is switched off, i.e. the hold of the magnet is off.

The hold of the magnet comprising a moving centre is switched on so that current is led to the coil in the opposite direction to when the hold was detached. The electric current is thus steered in the direction of the coil, which strengthens the magnetic field of the permanent magnet. Now the magnetic field of the coil starts to pull the centre towards it. Finally, when the force has increased enough, the closed circuit of the magnetic flux inside the magnet is again closed. The piece, which the magnet is used to grab, closes the circuit outside the magnet. If the electric current is still increased when the circuit of the magnetic flux is closed, the holding force may even be increased multifold. The permanent magnet part in connection with the moving centre may for example be neodymium magnetic material. Neodymium magnetic material is in this text often called the shorter name neodymium, according to its one ingredient.

In one embodiment of the invention one or more springs have been arranged between the moving centre and the other parts of the magnet. The springback factor of the springs is arranged to push the centre away from the rest of the magnet, i.e. to break the closed circuit of the magnetic flux. This springback factor is then resisted with the permanent magnetic force. When the magnetic field generated with the coil is used to weaken the permanent magnetic field, at a certain strength of the electric magnetic field, the springs have the strength to push the centre away from the other parts of the magnet. Thus the closed circuit is broken, the magnetic force is weakened and the magnet is switched off, i.e. the hold of the magnet is off. When switching on such a magnet, the centre and the thereto attached permanent magnet part start to move, when the magnetic field is stronger than the springback factor of the springs. By means of said springs, the relationship between the coil and the permanent magnet may be adjusted. The springback factor of the springs manages a part of the switching off of the magnet, whereby the coil can be made a bit smaller than what would be needed without the springs.

In one embodiment of the invention the first and/or second magnet of the attaching device comprises A shell and a centre, which are arranged to steer the magnetic flux to the piece to be grabbed. The centre is arranged to be moveable in relation to the rest of the magnet between a holding position and an open position, in order to close and open the circuit of the magnetic flux.

A permanent magnet for forming a magnetic field and thereby for keeping the centre in connection to the rest of the magnet, i.e. in the holding position;

An electric magnet coil arranged around the centre for switching off the magnetic flux provided by the permanent magnet at least partly, when necessary, in order to detach the centre from the connection of the rest of the magnet, i.e. for moving it into the open position.

In one embodiment of the invention the attaching device comprises

One or more springs, which help the centre of the magnet to detach from the other parts of the magnet when the magnetic flux is weakened sufficiently with the aid of the magnetic field produced with the coil. One or more springs is thus arranged between the moving centre and the other parts of the magnet.

In one embodiment of the invention the magnet, i.e. typically its moving centre, is controlled between the holding position and the open position with electric current pulses led into the coil. The duration of the pulse may for example be about half a second or 0.1-1 seconds.

In the holding position the electric current pulse switches off the magnetic flux to the extent, where the springs move the parts of the centre away from the rest of the magnet and thus open the closed circuit of the magnetic flux. The magnet thus moves to the open position. The open position is changed to the holding position with an opposite pulse, which increases the magnetic flux, so that the centre moves into contact with the rest of the magnet, whereby the circuit of the magnetic flux again closes.

The movement of the magnet parts may be controlled in a controlled manner for example with the aid of a processor by giving the coil for example a PWM signal (Pulse Width Modulation). The control may occur also by changing the level of the current. The PWM signal means that the active time of the signal may be selected in relation to the inactive time of the signal. For example a pulse with a 10 second total duration may consist of a 0.5 second part, when the signal is on, and a 0.1 second part, when the signal is off.

In one embodiment of the invention the centre of the magnet has a shape, which is constricted in one end, which shape allows for the use of a larger permanent magnet and coil. Simultaneously the hold of the magnet is improved.

In one embodiment of the invention the edge of the shell meant to be in contact with the piece to be grabbed is bevelled to be thinner in order to improve the hold of the magnet.

The magnetic material part of the magnet of the attaching device can be realized from different magnetic materials, such as AlNiCo, so-called rare-earth magnets such as neodymium magnets (i.e. a NdFeB, NIB or Neo magnet) or a ceramic magnetic material. For example the AlNiCo magnetic material is suitable as a demagnetisable and re-magnetisable magnetic material. AlNiCo is a metal alloy, which is manufactured from aluminium (Al), nickel (Ni) and cobalt (Co). There may additionally be iron, copper and titanium in the alloy. A typical alloy ratio is 8-12% Al, 15-26% Ni, 5-24% Co, max. 6% Cu and 1% Ti, the rest is Fe. For example NdFeB and/or a ceramic magnetic material may be used as the permanent magnetic material. A neodymium magnet is a rare-earth magnet, an alloy of neodymium, iron and boron. A ceramic magnet is a magnet manufactured with powder-metallurgic methods, which has large amounts of metal oxides. For example ceramic ferrite is a ferromagnetic ceramic material, which has iron oxide, boron and barium or strontium or molybdenum. Some examples of suitable magnetic materials are AlNiCo 5, NdFeB 40 MGOe and Ceramic 8.

Depending on the used magnetic material and the need at the time, the outer dimensions of the magnetic clamp vary. The magnetic material part may be formed for example to be cylindrical. The diameter of the cylindrical magnetic material part may for example be less than 200 mm, less than 100 mm, less than 50 mm, 25-200 mm, 25 or 50-100 mm. The height of the magnetic material part may for example be less than 100 mm or less than 50 mm or less than 10 mm or 25-100 mm or 1-25 mm or 0.5-3 mm. In order to improve the hold, the diameter of the magnetic material may for example be 10-30% larger than the centre.

In one embodiment according to the invention the control means of the attaching device comprise a wireless receiver and/or transmitter in order to transmit control data.

In one embodiment according to the invention the attaching device functions completely wirelessly in normal use. In other words the electricity needed by the attaching device is charged wirelessly and the data transfer to the attaching device and from it is performed wirelessly.

In one embodiment according to the invention the control means of the attaching device comprise control devices for the holding means, such as the electric magnet, of the attaching device.

Even though this text mainly discusses an attaching device and an arrangement for attaching an object to be worked to a working base, it is clear that another aspect of the present invention is a magnet with a controllable effect according to the invention as such and a magnet used in many other embodiments. All embodiment examples and alternatives mentioned in this text are, when applicable, suitable also in connection with a magnet according to the second aspect of the invention. The attaching device according to the invention may be seen as one embodiment of the magnet with controllable effect according to the invention. In an advantageous embodiment the magnet is switched off and on partly mechanically by moving the parts of the magnet in relation to each other. The magnet may for example have a centre comprising a permanent magnet part, which is arranged to be movable in relation to the rest of the magnet, which can be arranged at least partly inside the coil. One or more springs may in a manner described above have been arranged between the centre and the rest of the magnet.

In one embodiment of the invention the magnet is used as a so-called bistable magnet. A small amount of energy is sufficient to open and close a bistable magnet. Bistable magnets can be kept switched on and switched off without using energy. Thus the arrangement according to the invention can be used to decrease the amount of energy used in the process.

In one embodiment of the invention the magnet functions as an electrically controllable shock absorber, which can simultaneously also be used to produce energy. The magnetic field of the coil may be used to decelerate the movement of the centre moving inside the coil. If for example a centre comprising neodymium is moved inside the coil, electric current is generated in the coil. This is thus a generator, which produces electric energy.

The magnet according to the invention can be used in applications moving along metal surfaces. Examples of such applications are for example means for washing the bottom of ships, and various other robots, such as welding and painting robots. In these applications the apparatus is moved along the metal surface and thus they need a strong, firmly holding magnet. Such a magnet is advantageously also controllable with a low amount of energy.

The magnet according to the invention can also be used for controlling magnetic valves and magnetic locks at least between an open position and a closed position. Magnetic valves and magnetic locks according to existing technology require energy for keeping them switched on or off, while the embodiment according to the invention needs energy only for changing the state.

The magnet according to the invention can be used for controlling movement, because the centre is arranged to be moving. This moving centre can be moved with a small pulse, whereby the springs are released, and a movement is generated, which always remains in its extreme position to await a new pulse.

BRIEF DESCRIPTION OF THE FIGURES

The invention is described in more detail below with reference to the enclosed schematic drawing, in which.

DETAILED DESCRIPTION OF THE EXAMPLES OF THE FIGURES

For the sake of clarity, the same reference numbers are used for at least some corresponding parts in different embodiments.

Figure 1:
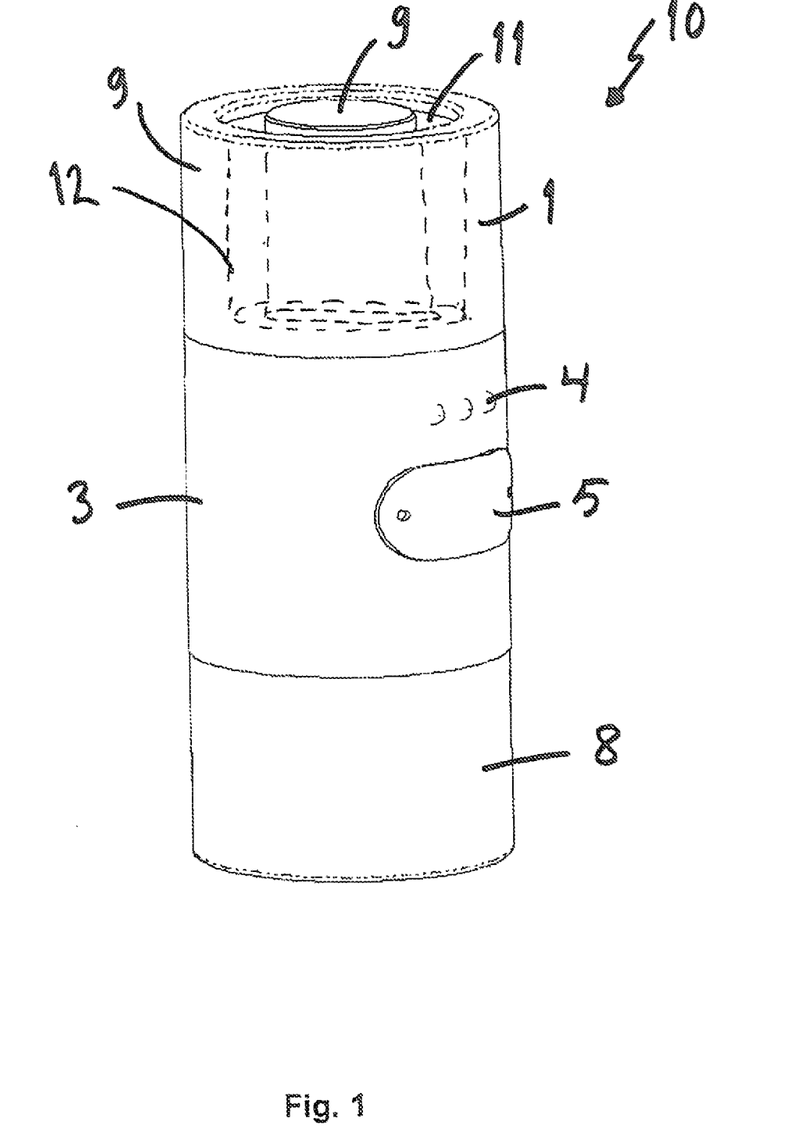
FIG. 1 shows an attaching device according to the invention.
Figure 2:
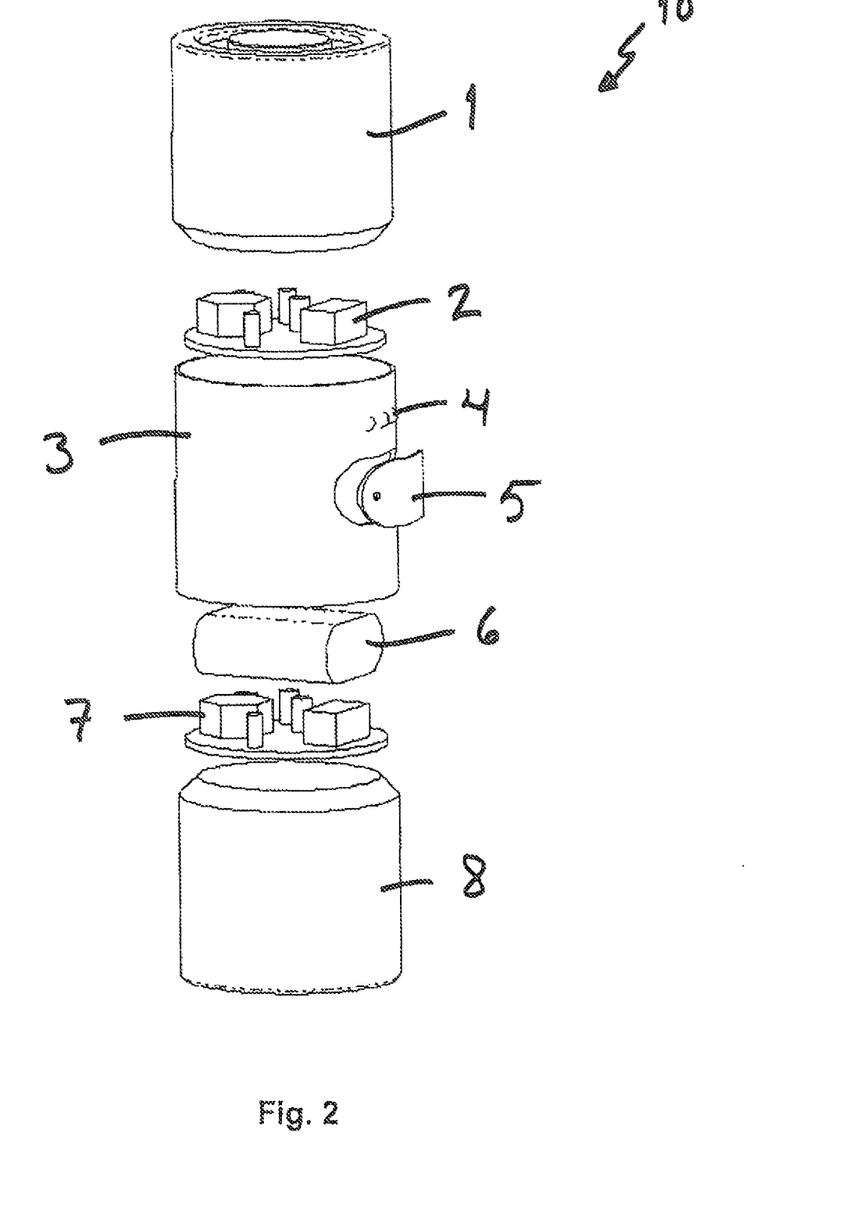
FIG. 2 shows the attaching device 5 of FIG. 1 taken apart.

In the middle of the mainly cylindrically formed attaching device 11 shown in FIGS. 1 and 2 there is a shell 3 manufactured from a suitable material, such as fibreglass or some other material, which lets through an RF signal. If the control signal of the attaching device is something other than an RF signal, for example light, the material of the shell may be some other material suitable for the purpose. The other parts of the attaching device are supported on the shell or they are arranged inside it or joined together with screws. In the lower edge of the device 10 there is a first magnet 8, which is meant for attaching the device 10 to a working base. In the upper edge of the device 10 there is a second magnet 1, which to its structure corresponds to the first magnet 8, which second magnet is meant for attaching the device 10 to the object to be worked. The structure of the magnets is shown 15 in more detail in FIGS. 2, 4 and 5.

An electric magnet part 11, i.e. an electric magnet, has been arranged inside the magnetic material part 9 manufactured from a permanent magnetic material. The coil of the electric magnet 11 is drawn in the figure very schematically with dotted lines 12. A battery 6 and two circuit boards 2 and 7 have been arranged inside the shell 3, between the first and second magnet. The shell 3 has a service hatch 5 that can be opened, which leads though the shell, for example to enable the changing of the battery 6. Led lights have also been arranged through the shell, which can be used to indicate for example the charge state of the battery 6 or if the battery is charging. The leds may also be used to indicate for example if the first or second magnet is switched on or off.

In the lower i.e. first circuit board 7 there is for example control electronics for the electric magnets 11, a thermometer, and a charging device for the battery 6. In the upper second circuit board 2 there is a radio transmitter/receiver for transmitting control information and operation information of the attaching device 10 between the attaching device 10 and the control unit outside it.

Figure 3:
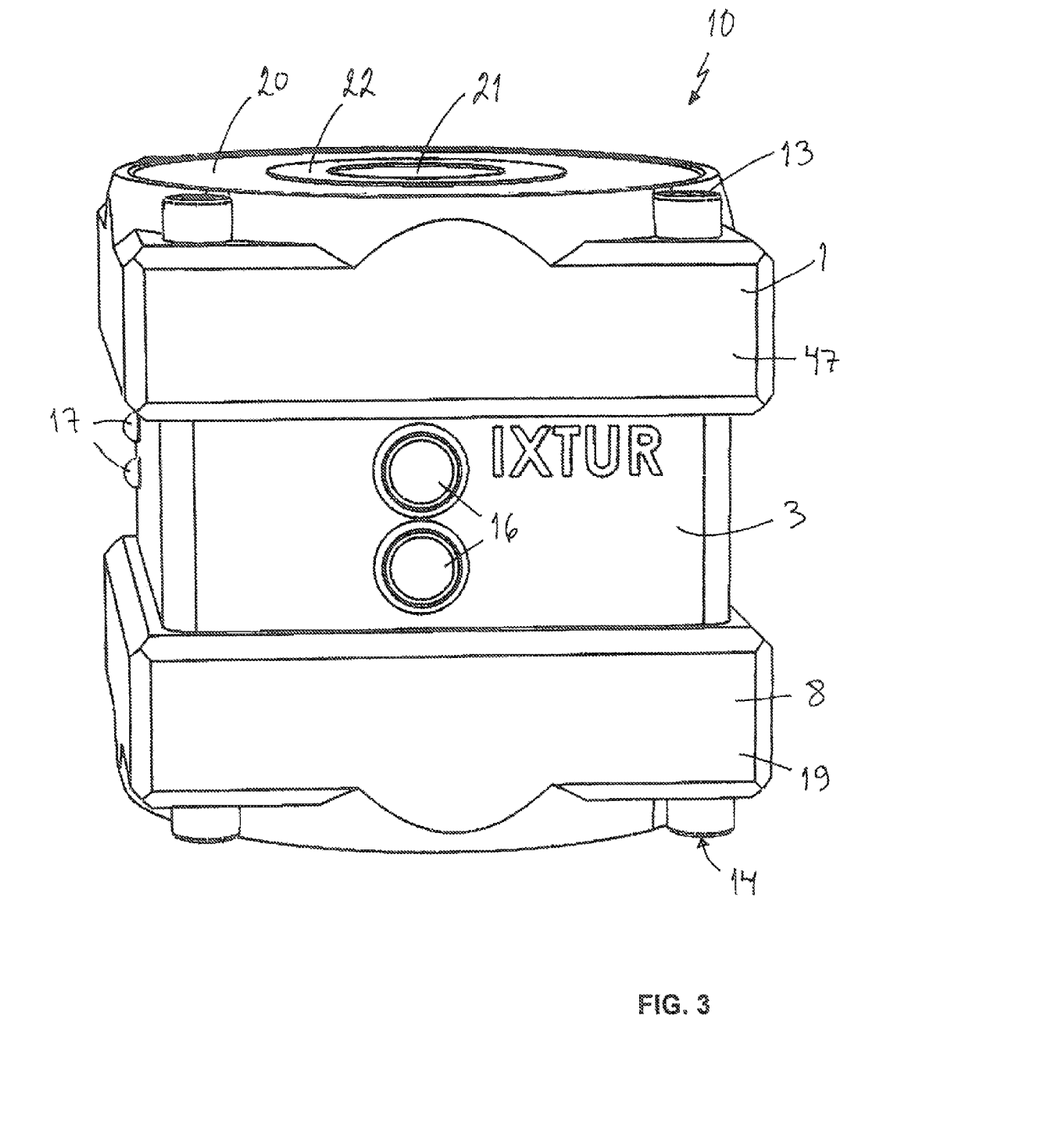
FIG. 3 shows a second attaching device according to the invention.
Figure 4:
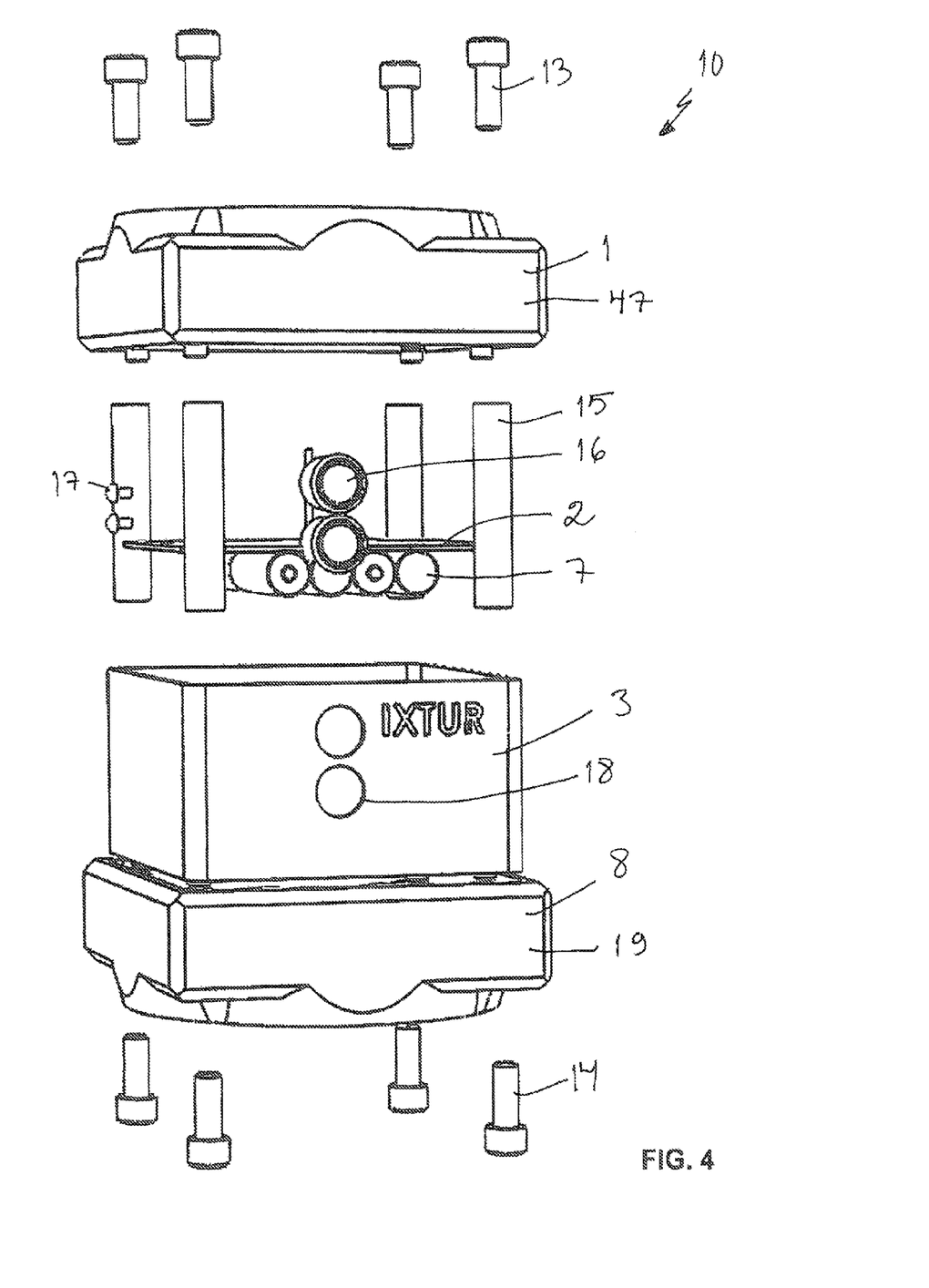
FIG. 4 shows the attaching device of FIG. 3 taken apart.

FIGS. 3 and 4 show an attaching device 10, which to its shape mainly is a cubic or rectangular prism. The upper magnet 1 is attached to the rest of the device with attaching screws 13. The lower magnet 8 is attached to the rest of the device with attaching screws 14. Between the upper magnet 1 and lower magnet 8 there is a shell 3. Inside the shell 3 has been arranged connection pipes 15 supporting the structure, by means of which the upper magnet 1 is connected to the lower magnet 8. Among others a circuit board 2 is placed between the connection pipes, in the so-called frame part. Electric components needed by the device, such as selection switches 16, are attached to the circuit board 2, by which switches the operation of the attaching device 10 may be controlled manually. From the selection switches 16 the magnets 1 and 8 may for example be switched on and off. They may additionally be used to give commands to switch off the attaching device 10 or to activate a switched-off attaching device 10. The selection switches 16 may have one or more led indicators, from which different information about the magnet state may be seen, such as "open" or "closed" or "system failure". Batteries 7 have also been attached to the circuit board 2, and electric charging connectors 17 for bringing charging current for the batteries from the charging device. The charging connectors 17 may for example also be strip-like. Openings 18 have been formed in the shell 3 for using the selection switches 16. There are also openings for the charging connectors 17 in the shell (not shown).

Among others components needed for communication, such as a RF transmitter and receiver, sensors monitoring the state of the magnet and a processor, the software in which manages among others the data communications, interruptions in the operation and alarms, are also attached to the circuit board 2. The communication may for example be the direct two-way communication with a device controlling the attaching device 10, i.e. a so-called Interface, or the forwarding of a message to another attaching device and/or Interface. An interruption of the operation may be caused for example by the state of the magnet 1 or 8, the temperature or a weakening in the charging level of the battery or other anomaly. The interruptions in operation may for example be set as limit values of the program controlling the attaching device, the surpassing of which causes an interruption.

Figure 5:
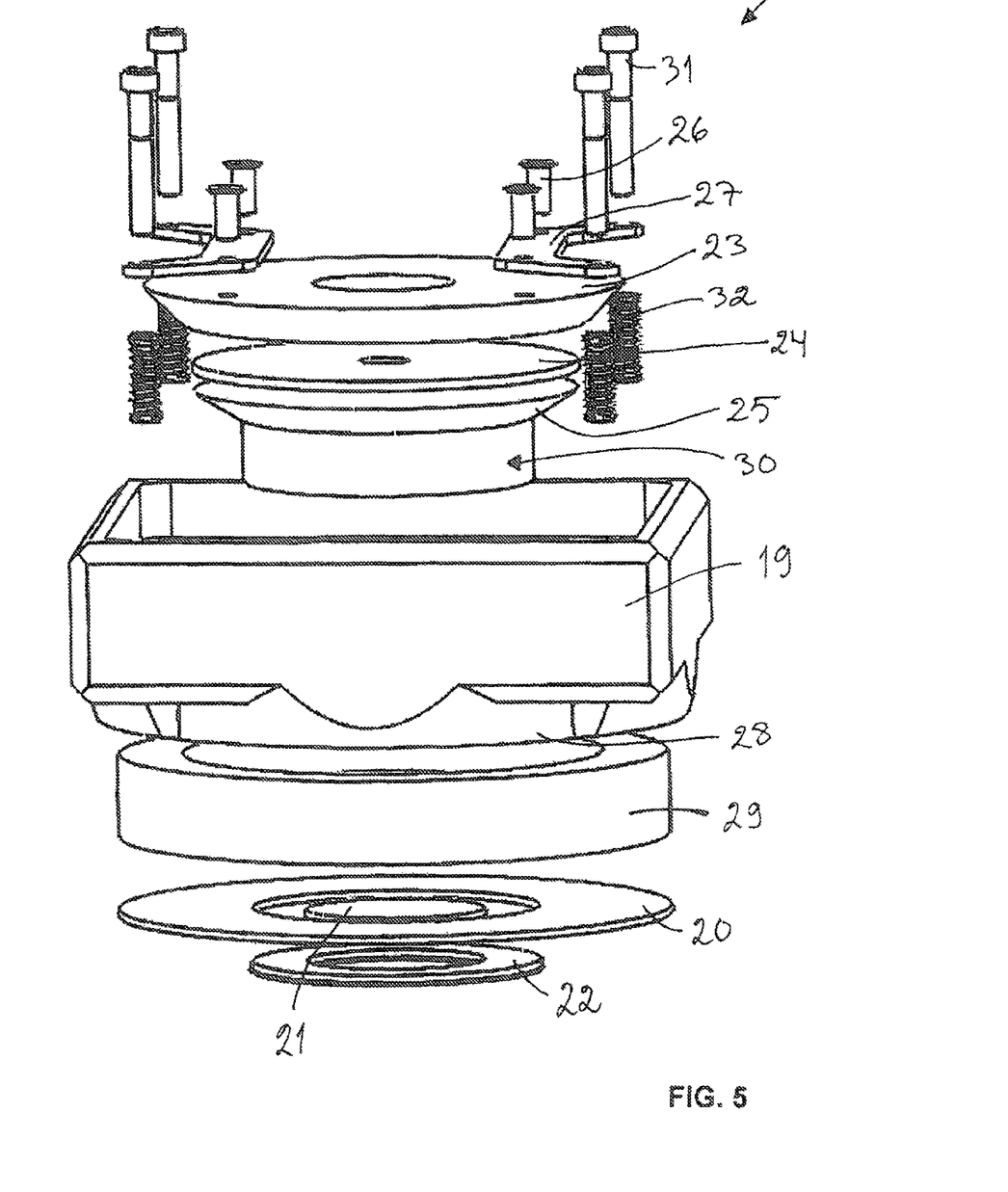
FIG. 5 shows a magnet according to the invention as opened

FIG. 5 shows a magnet 8 according to the invention taken apart. For example the lower magnet 8 shown in FIGS. 3 and 4 may have the structure shown in FIG. 5. The upper magnet 1 in FIGS. 3 and 4 may have a corresponding structure. The centre 30 of the magnet comprises a back plate 23, a neodymium magnet 24 and a slide 25 attached together. The attaching screws 26 of the pushing plates attach the pushing plates 27 to the back plate 23. Stopper screws 31 hold the parts of the magnet 8 together. The centre is arranged to be moveable in relation to the rest of the magnet 8. When the centre is in the lower position it settles partly inside the coil 29 of the electric magnet. The pushing springs 32 are arranged around the stopper screws 31 so that they strive to push the centre 30 upwards, i.e. away from the coil 29 and the bottom plate 22 of the centre. The pushing springs 32 thereby help the coil 29 to switch off the magnet 8 and to keep the magnet 8 switched off. For example if the coil 29 does not switch off the magnet 8 completely but the pushing springs 32 can already push the centre 30 away, the magnet is switched off by the co-operation between these. The pushing plates 27 centre the slide 25 into place and relay the pushing force of the springs 32 to the slide.

The piece, which the magnet 8 in FIG. 5 grabs, is placed against the lower surface of the magnet 8. Brass plates 20 and 21 have been arranged at the bottom inside the shell 19 of the magnet, and a lower ring 22 of the centre between them. The lower ring 22 of the centre is attached with the outermost brass plate 20 to the shell 19, so that the magnet 8 does not have moving parts, which can be seen from the outside. The smaller brass plate 21 is attached to the lower ring 22 of the centre, whereby the lower surface of the magnet is even. In its lower position the centre 30 touches the lower ring 22 of the centre, whereby the magnetic flux can pass to the piece to be grabbed. When the centre 30 is lifted up, the passage of the magnetic flux to the piece to be grabbed is prevented. The shell 19 of the lower magnet functions as a part which leads the magnetic flux. Correspondingly the shell 47 of the upper magnet seen in FIGS. 3 and 4 functions as a part which leads the magnetic flux in the upper magnet 1. The brass plates 20 and 21 insulate the magnetic flux so that it cannot leak from the shell 19 to the centre 30. In the lower edge of the shell 19 there is a bevelling 28, which is meant to be in contact with the piece to be grabbed. The bevelling 28 steers the magnetic flux in order to achieve a greater holding force and increases the surface adhesion of the magnet. Thus due to the bevelling 28, the magnet holds well also with a thin plate.

The slide 25 narrows towards the bottom. Thus the centre 30 is constricted, i.e. tapered. A larger coil 29 may be arranged around the constricted centre 30. A larger coil 29 makes possible the use of a larger effect, whereby a larger permanent magnet may in turn be used, such as a neodymium magnet 24. By means of the constricted centre a greater holding force is thus achieved than without the constriction.

Figure 6A:
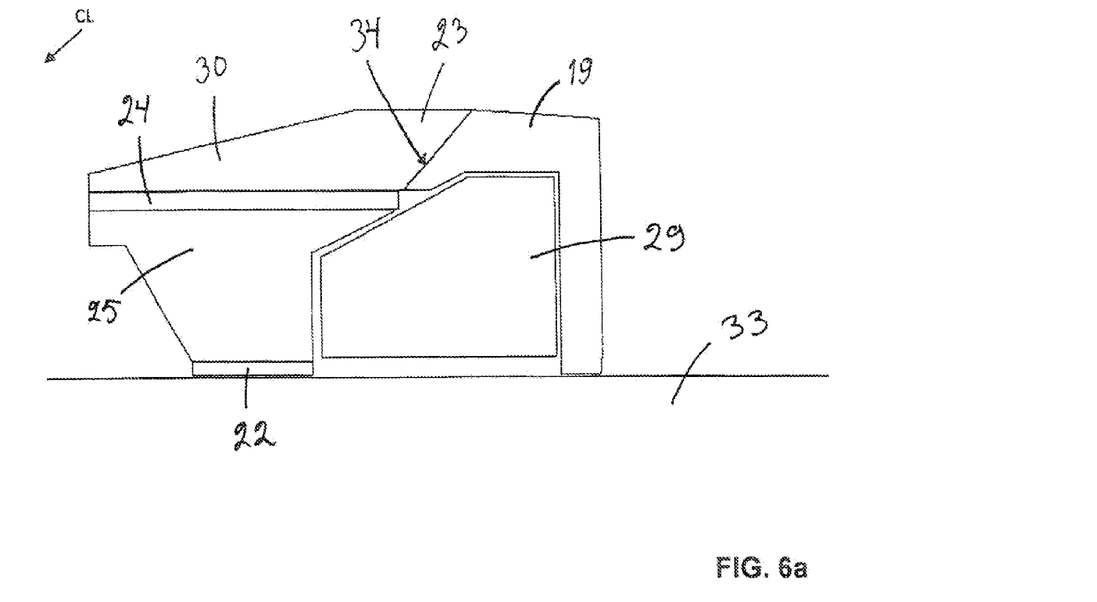
FIG. 6a shows a partial cross-section of a detail of a third attaching device according to the invention.
Figure 6B:
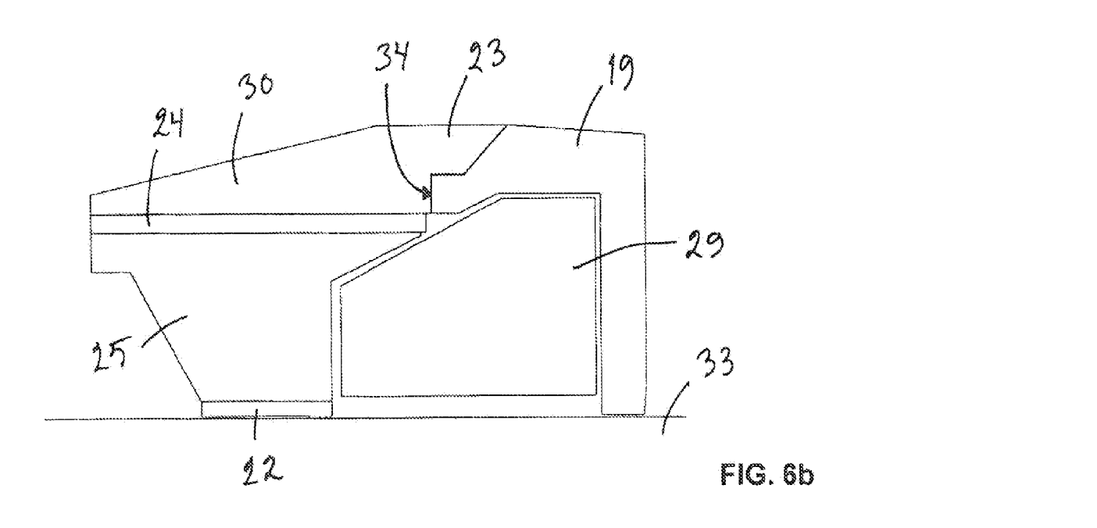
FIG. 6b shows a partial cross-section of a detail of a fourth attaching device according to the invention.

FIG. 6a shows a partial cross-section of a detail of a third attaching device according to the invention. FIG. 6b shows a partial cross-section of a detail of a fourth attaching device according to the invention. A piece 33, which the magnet is meant to grab, is drawn to be visible in FIGS. 6a and 6b. A back plate 23, a shell 19, a neodymium magnet 24, a slide 25, an electric magnet coil 29 and a lower ring 22 of the centre are seen in the figures. The back plate 23, neodymium magnet 24, slide 25 attached together form a moving centre 30. The difference between FIGS. 6a and 6b is that the surfaces of the centre 30 and the rest of the magnet, i.e. the shell 19 in the figures, are vertical in FIG. 6b in the contact spot 34, i.e. in the direction of the movement of the centre. In FIG. 6a the corresponding surfaces in the contact spot 34 are slanted in relation to the movement of the centre 30. By means of the solution in FIG. 6b the opening and closing of the circuit of the magnetic flux is more efficient in some situations.

Figure 7A:
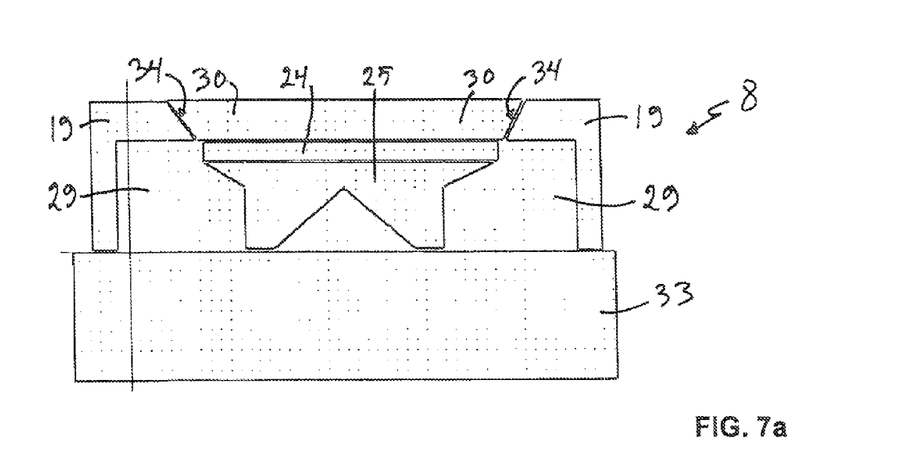
FIGS. 7a, 7b and 7c show simulations of a magnetic flux in the attaching device according to the invention.
Figure 7B:
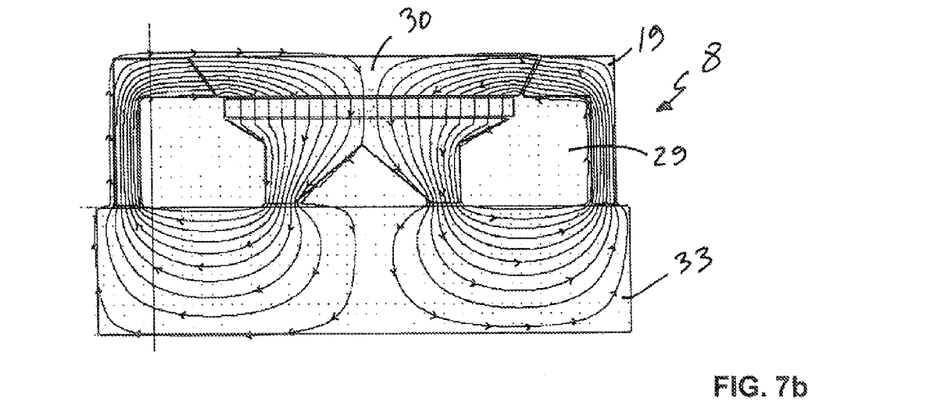
Figure 7C:
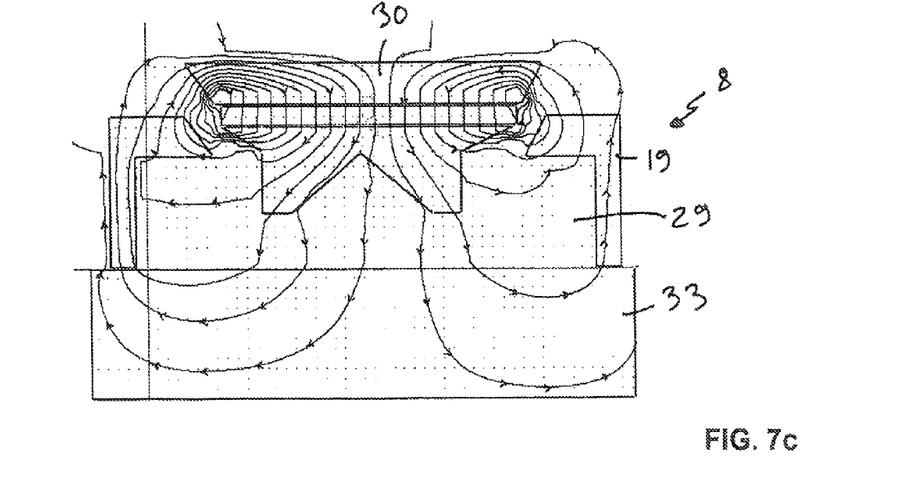

FIGS. 7a, 7b and 7c show simulations of the magnetic flux in the magnet 8 of an attaching device according to the invention. FIG. 7a shows just a simulation model when the centre 30 is in the lower position, i.e. the magnet is in the holding position. In FIG. 7b the situation is the same as in FIG. 7a, but the simulated passage of the magnetic flux is drawn in the figure with lines. In FIG. 7b the centre 30 is lifted away from the rest of the magnet i.e. the shell 19. The magnet is thus in the open position. From the figures can be seen how the passage of the magnetic flux breaks in the open position.

Figure 8:
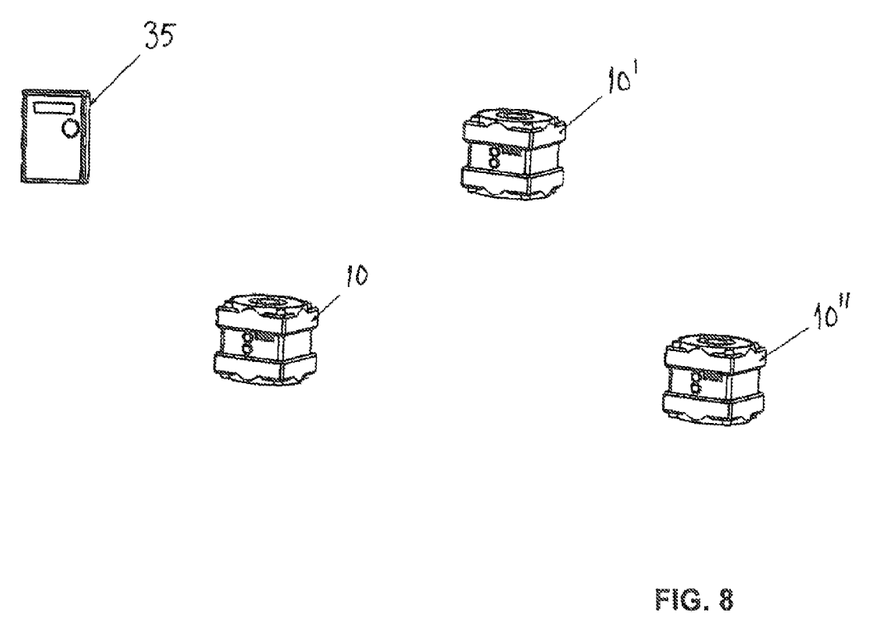
FIG. 8 shows an arrangement according to the invention.

FIG. 8 shows an arrangement according to the invention for attaching an object to be worked to the working base. The arrangement comprises a control unit i.e. an interface 35, and three identical attaching devices 10, 10' and 10" according to the invention. The control unit 35 transmits messages from the controlling system (not shown) to the attaching device. The control unit has a so-called I/O inlet and it may be controlled for example with a 5V, 12V or 24V voltage. The controlling system may be a robot (see FIG. 12), a welding device, a cutting device or another corresponding programmable device. In the program, which may be run on the processor of the control unit 35, it has in advance been defined what should be done when as certain I/O command arrives. The I/O may for example be 8, 16, 32 or 64-bit.

The robot for example gives a command [32] to the control unit. It may for example mean "Open the upper magnet of the attaching device". The control unit reads the command [32] in its inlet ports. The information that the MAC address of the upper magnet of the attaching device 10 is 54321 has been programmed into the software in advance. Thus the control unit sends the command [32] to the address 54321. The software in the processor in the attaching device 10 knows that when the command [32] arrives, the upper magnet should be opened. The attaching devices in the system may be identical. Only their MAC addresses are individual. The MAC addresses of the attaching devices are programmable with the control unit, so any available attaching device 10, 10' or 10" may receive the command, as long as the attaching device is programmed into the system. Thus the program in the robot does not need to be changed, even if one of the attaching devices were to be out of use. There may be several, even hundreds of cubes in the system at the same time.

Figure 9:
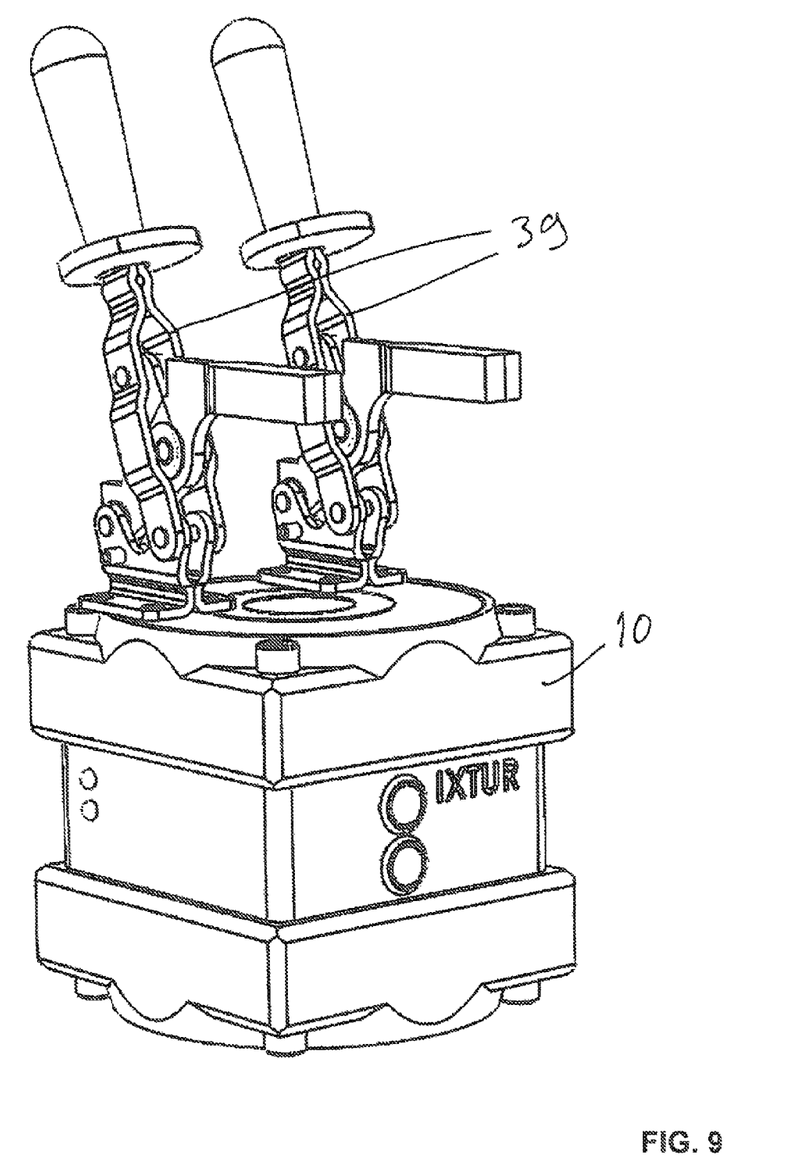
FIG. 9 shows an attaching device according to the invention, where two lever pliers have been attached.

Various tools, which assist in grabbing the pieces 33 to be worked, may be connected to the attaching device 10 according to the invention. FIG. 9 shows an attaching device 10, where two lever pliers 39 have been attached.

Figure 10:
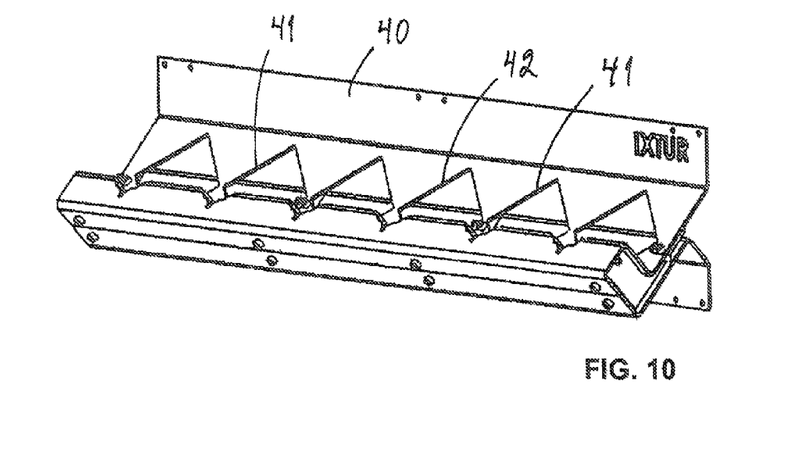
FIG. 10 shows a charging mount for attaching devices according to the invention.

FIG. 10 shows the charging mount 40 for attaching devices according to the invention, which has six places 41 for an attaching device. The attaching devices 11 are stored in the charging mount when they are not needed. The mount has a charging device (not shown), which has charging means suitable for the attaching devices 10, such as connectors suiting the charging connectors 17 seen in FIGS. 3 and 4. The battery of an attaching device 10 in the mount may thus be charged. The edges 42 of the places for the attaching devices advantageously also position the cube when it is set in the mount.

Figure 11:
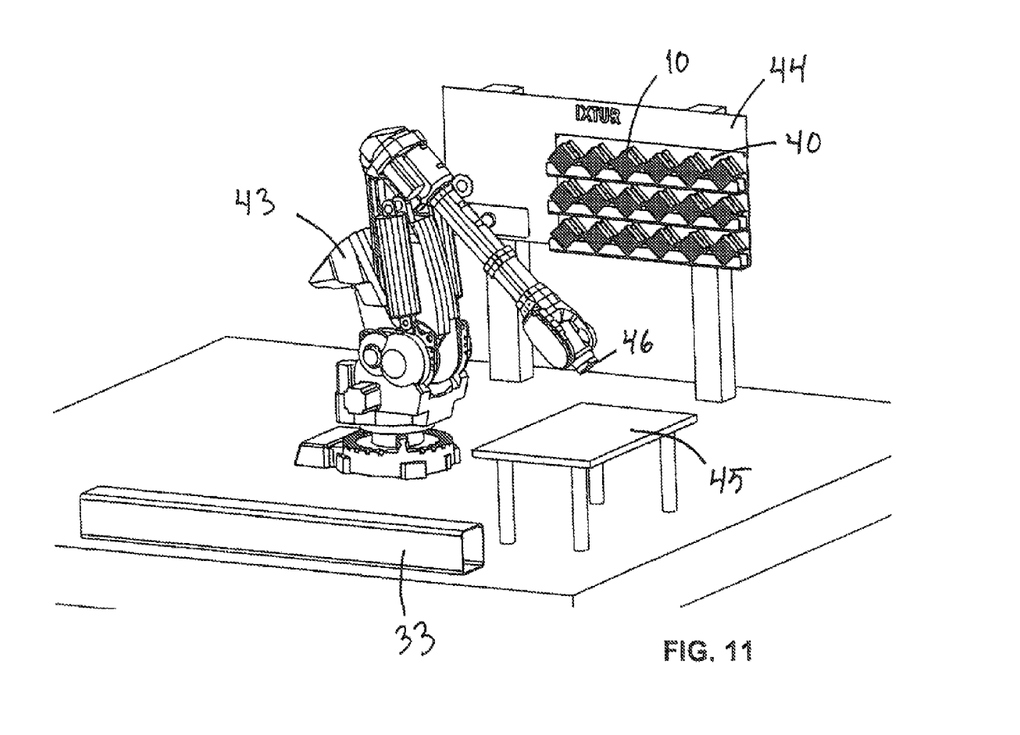
FIG. 11 shows a working place.

FIG. 11 shows the working place of a robot 43, where an arrangement according to the invention is used. The working place has eighteen attaching devices 10 and a charging mount 40 for them, which is placed in a tool mount 44. The metallic work surface 45 is empty. The robot has a magnetic tool 46, with which it takes the attaching devices from the charging mount 40 and places them on the work surface 45. When it has assembled a desired jig from the attaching devices 10, it places the piece to be worked in the jig, changes the tool and starts the working.

The operation of an embodiment of the invention may for example be described as follows. An electric current of a desired magnitude is steered to the coil 29 based on the software executed with the processor on the circuit board 2 of the attaching device 10. When current is led to the coil in a certain direction, the magnetic field produced by the coil weakens the magnetic field of the permanent magnet 24. At a certain strength of the magnetic field the moving centre 30 moves away from the rest of the magnet. The detaching occurs for example when the strings 32 have the strength to push the centre 30 away from the frame, into the open position. Thus the magnetic flux cannot pass, the magnetic force is weakened and the magnet is switched off, i.e. the hold of the magnet is off. When the hold of the lower magnet 8 is off, it can be placed on the metal of the work surface 45 or on another attaching device. Thereafter a current is led into the coil 29 in the opposite direction to when the hold was detached. The electric current is thus steered in the direction of the coil, which strengthens the magnetic field of the permanent magnet 24. Now the magnetic field of the coil starts to pull the permanent magnet part 24 towards it. In the end, for example when the magnetic field is stronger than the springback factor of the springs 32, the centre 30 i.e. the slide and the thereto attached permanent magnet part 24 start to move toward the holding position. Finally, when the force has increased enough, the circuit of the magnetic flux is again closed. Thus the magnet receives more holding force. The permanent magnet part 24 may for example be neodymium magnet.

The operation of an embodiment of the invention, where a robot controls the arrangement, may be described as follows. The control unit 35 receives from the robot 43 the command "Open the upper magnet 1 of the attaching device 10". The control unit 35 transmits the message to the attaching device 10. The attaching device 10 receives the message and opens its upper magnet 1 according to the command. When the upper magnet has opened the attaching device 10 in turn sends a message to the control unit 35, observes it, and forwards it to be read by the robot 43 to the I/O port of the control unit: "The upper magnet 1 of the attaching device 10 is open". The robot may thus verify that the message has been received and the command has been realized.

The operation of another embodiment of the invention, where a robot controls the arrangement, may be described as follows. The control unit 35 receives from the robot 43 the command "Open the upper magnet 1 of the attaching device 10". The control unit 35 transmits the message to the attaching device 10. If the attaching device 10 does not respond to the message within a certain time frame, the control unit 35 tries again. If the attaching device 10 still does not answer, the control unit 35 gives a forwarding command. The control unit 35 has information in its memory regarding which attaching devices the system has in use and it requests the nearest other attaching device to forward the message. Now the attaching device 10' receives a request to forward a message and forwards the message to the attaching device 10. The attaching device 10 opens its upper magnet and responds to the attaching device 10' "The upper magnet 1 of the attaching device 10 is open". The attaching device 10' forwards the message to the control unit 35 and this forwards it to the robot 43. Thus the message has been received and the command has been acknowledged. The system functions like this itself and the user does thus not need to separately observe that the message is received. Any attaching device of the system may function as the transmitter to any other attaching device in the system. It is also possible to program corresponding programs in the processor of the attaching device as into the control unit 35, whereby the attaching device itself may function as a controller of others, without a separate control unit 35.

A sensor, which gives information to the processor if the centre strives to move when the magnet should be in the holding position, may be placed in the moving centre, for example in the back plate. In the holding position the centre moving in relation to the rest of the magnet would mean that the magnet is detaching. Thus the processor may increase the holding force of the magnet by giving more current to the coil in the suitable direction, which strengthens the magnetic flux. Such an active monitoring of the hold and increase in strength as needed is important, in order for the system to be reliable. Real-time information about the hold is needed for example when welding, cutting and in corresponding situations. Thus real-time monitoring of the state of different fasteners, for example those used in laser welding, becomes possible.

By means of the invention a work machine, such as a robot, may assemble a lifting device of a required shape for itself for object handling from attaching devices according to the invention and possible additional pieces.

The figures show only a few preferred embodiments according to the invention. Facts of secondary importance with regards to the main idea of the invention, facts known as such or evident for a person skilled in the art, such as electric cables, data communication devices or support structures possibly required by the invention, are not separately shown in the figures. It is obvious to someone skilled in the art that the invention is not limited merely to the above-described examples, but the invention may vary within the scope of the claims presented below. The dependent claims present some possible embodiments of the invention, and they are as such not to be considered to restrict the scope of protection of the invention.

The invention claimed is:

1. A magnet, wherein the magnet comprises
    a shell and a centre, which are arranged to guide a magnetic flux to a piece to be grabbed, which centre is arranged to be mobile in relation to rest of the magnet, in order to close and open a circuit of the magnetic flux,
    a permanent magnet for forming a magnetic field and thereby for keeping the centre in connection to the rest of the magnet, and
    an electric magnet coil arranged at least partly around the centre for partly turning off the magnetic flux provided by the permanent magnet, when necessary,
    wherein an edge of the shell meant to be in contact with the piece to be grabbed is bevelled to be thinner.

2. The magnet according to claim 1, wherein the magnet comprises one or more springs, which are arranged to mechanically detach the centre and the other parts of the magnet from each other when the magnetic flux produced by the permanent magnet weakens sufficiently due to a magnetic field produced by the electric magnet, i.e. the coil.

3. The magnet according to claim 1, wherein the shape of the centre is constricted at the part meant to be inside the coil.

4. An attaching device for attaching an object to be worked to a working base, the attaching device comprising
    first holding means in the first end of the attaching device for producing a first holding force to attach the attaching device to the working base or to another attaching device or to the object to be worked, the first holding means including a first magnet;
    second holding means in the second end of the attaching device for producing a second holding force to attach the attaching device to the working base or to another attaching device or to the object to be worked;
    control means for controlling the holding forces produced by the first and second holding means; and
    wherein the first magnet is according to claim 1.

5. The attaching device according to claim 4, wherein the second holding means is a second magnet, the second magnet comprising:
    a shell and a centre, which are arranged to guide a magnetic flux to a piece to be grabbed, which centre is arranged to be mobile in relation to a rest of the second magnet, in order to close and open a circuit of the magnetic flux, a permanent magnet for forming a magnetic field and thereby for keeping the centre in connection to the rest of the second magnet, and an electric magnet coil arranged at least partly around the centre for partly turning off the magnetic flux provided by the permanent magnet, when necessary.

6. The attaching device according to claim 4, wherein the control means comprise an electric power source, such as a battery, and means for leading the electric current in a controlled manner from the electric power source to the first and/or the second magnet in order to control its function.

7. The attaching device according to claim 5, wherein the control means are arranged so that the first and the second magnet are separately controllable.

8. The attaching device according to claim 4, wherein the attaching device comprises a wireless receiver for receiving a control signal of the control means.

9. The attaching device according to claim 5, wherein the attaching device comprises a frame, in different ends of which the first and the second magnet are attached, and the length of which frame may be selected as desired.

10. The attaching device according to claim 5, wherein the attaching device comprises a frame, in different ends of which the first and the second magnet are attached, and that the frame is arranged to be bent in a desired position.

11. An arrangement for attaching an object to be worked to a working base, wherein the arrangement comprises at least one attaching device according to claim 4;

a control unit for producing control signals for the first and/or the second magnets of the attaching devices; and data transfer devices for transmitting the control signals to the control means of the attaching devices.

12. The arrangement according to claim 11, wherein the arrangement comprises a robot or a corresponding NC-programmable device, which comprises means for placing the attaching devices in desired places on the working base.

13. A method for attaching an object to be worked to a working base by an attaching device, the method comprising:

attaching an attaching device by its first end to the working base or to another attaching device or to the object to be worked, with the aid of a first holding force produced by first holding means;

attaching the attaching device by its second end to the working base or to another attaching device or to the object to be worked, with the aid of a second holding force produced by second holding means;

the method comprising using one or more attaching devices and/or an arrangement;

the one or more attaching devices comprising: first holding means in the first end of the attaching device for producing a first holding force to attach the attaching device to the working base or to another attaching device or to the object to be worked, the first holding means including a first magnet; second holding means in the second end of the attaching device for producing a second holding force to attach the attaching device to the working base or to another attaching device or to the object to be worked; and control means for controlling the holding forces produced by the first and second holding means; and the arrangement being in accordance with claim 11.

14. The method according to claim 13, wherein the method comprises moving the centre in relation to rest of the magnet, in order to close and open a circuit of the magnetic flux, i.e. in order to change a state of the magnet between a holding position and an open position;

holding the centre in connection with the rest of the magnet with a magnetic field of the permanent magnet, when the circuit of the magnetic flux is closed, i.e. when the magnet is in the holding position; and turning off the magnetic flux provided by the permanent magnet at least partly, when necessary, by producing a magnetic field with the electric magnet coil arranged around the centre, in order to change the state of the magnet to the open position.

15. The method according to claim 14, wherein the method comprises producing a force with one or more springs, which force strives to mechanically detach the centre and the other parts of the magnet from each other when the magnetic flux produced by the permanent magnet weakens sufficiently due to the magnetic field produced by the electric magnet, i.e. the coil.

16. The method according to claim 14, wherein the method comprises monitoring movement of the centre in relation to the rest of the magnet with a sensor, and if movement is detected when the magnet is in the holding position, the holding force of the magnet is increased by giving more electric current to the electric magnet coil.

17. The use of an attaching device according to claim 4 under water.

* * * * *